United States Patent [19]

Hurwitz

[11] Patent Number: 4,764,948
[45] Date of Patent: Aug. 16, 1988

[54] DATA MARKING SYSTEM FOR MEDICAL X-RAYS, PARTICULARLY MAMMOGRAMS

[75] Inventor: Robert Hurwitz, Newport Beach, Calif.

[73] Assignee: Paula Hurwitz, Newport Beach, Calif.

[21] Appl. No.: 23,717

[22] Filed: Mar. 9, 1987

[51] Int. Cl.⁴ ............................................. G03B 17/26
[52] U.S. Cl. ...................................... 378/165; 378/162
[58] Field of Search ............................... 378/162, 165

[56] References Cited

U.S. PATENT DOCUMENTS

| | | | |
|---|---|---|---|
| 1,168,177 | 1/1916 | Yoanna | 378/165 |
| 1,396,415 | 11/1921 | Fried | 378/165 |
| 2,162,420 | 6/1939 | Buckley | 378/165 |
| 3,790,802 | 2/1974 | Mika et al. | 378/165 |
| 3,917,952 | 11/1975 | Jackson | 378/165 |
| 4,529,635 | 7/1985 | Sheldon | 378/165 |

OTHER PUBLICATIONS

X-Rite, Inc., "Medical X-Ray Marking System" Brochure, 9-85.
Siemans Radiology Identification Card, Nr. 200219.

Primary Examiner—Carolyn E. Fields
Assistant Examiner—Joseph A. Hynds
Attorney, Agent, or Firm—Stetina and Brunda

[57] ABSTRACT

A substrate transparent to x-rays mounts a resilient layer transparent to x-rays, and an overlying thin blocker layer of fracturable lead or tin foil which is opaque to x-rays. When impressed or typewritten the blocker layer is selectively stenciled or fractured to permit selective passage of x-rays therethrough. The substrate or a perforated portion thereof mounting the stencil, is emplaced upon an x-ray cassette during x-ray exposure to capture the stencilized data in the permanent film image. Visual inspection of stencilized data may be aided by a white paint layer disposed upon the blocker layer. Affixation to the film or cassette may be aided by a pressure sensitive adhesive layer in an area adjacent the other superimposed layers.

31 Claims, 1 Drawing Sheet

DATA MARKING SYSTEM FOR MEDICAL X-RAYS, PARTICULARLY MAMMOGRAMS

BACKGROUND OF THE INVENTION

1. Field of the Invention.

The present invention relates to marking data, specifically patient identification data, in the permanent emulsion of medical x-ray images, particularly mammograms.

2. Discussion of the Relevant Art.

It is a long-standing trend in radiology to positively place patient identification data in the permanent emulsion of any obtained patient x-ray. Pertinent patient identification data normally includes information such as the patient's name, medical record number, date, location, and identification of the equipment upon which the x-ray is obtained. Failure to properly and permanently identify medical x-rays may, at best, cause such unlabeled x-rays to be become misplaced, misidentified to the patient, or unidentified to the patient—resulting in a requirement for patient re-exposure to x-rays. At worst, an improperly identified or unidentified x-ray might result in misadministration of a therapeutic procedure to the wrong portion of the proper patient, or to the wrong patient.

Due to the requirement for permanent, positive identification of medical x-rays, techniques such as affixing stickers to the obtained x-rays or writing by hand on the x-ray films are generally considered unacceptable. Such techniques are implicitly non-permanent and allow for error by the radiological technologist in improperly identifying films. There is a small possibility, albeit remote, of improperly changing the patient's name or other patient data by accident or artifice subsequent to an initial labeling. Delays, howsoever minute, between the generation of an x-ray image and transcription of data thereon may result in confusion causing an erroneous affixation of information to a particular x-ray image. Although part of the high skills and extensive training of a radiological technologist is explicitly directed to the elmination of error in the identification of x-ray images, errors will inevitably occur. Any large medical facility, such as a hospital, which generates vast numbers of x-rays incur errors in its x-ray identifications in proportion to the strength and refinement of its x-ray identification procedures as well as in proportion to the diligence of its x-ray technologist personnel.

Because of the obvious requirement for positive patient identification in the permanent image of medical x-rays, it has long been the prevailing procedure to selectively block portions of an x-ray film exposed by the standard film-screen technique in order to later place patient identification data within these selectively blocked portions. The patient identification data thus appears within the permanent image of the developed x-ray film. Particularly in the prior procedure, an x-ray film or cassette used in the standard film-screen x-ray technique contains a small region, normally rectangular in shape, which is initially covered by a lead blocker. When the x-ray film or cassette is exposed with an anatomical image, the area under the lead blocker is shielded from the x-ray beam and thereby not exposed. The still undeveloped x-ray film cassette is then inserted (in room light) into an "identification camera" such as the X-Omatic device made by the Kodak Corporation. This identification camera automatically slides the lead blocker from that region where it had previously occluded an area of the x-ray film during radiology, thereby allowing selective exposure of that area of the film. Next, a flash card, which is simply a modified index card preferably having a glossy finish onto which patient identification data and other desired data has been previously typed, is also inserted into the "identification camera". The "identification camera" subsequently flashes this data onto the previously unexposed area of the x-ray film, exposing the film with the data image. The entire x-ray film is then developed in a routine fashion, therein permanently capturing both the patient anatomical image and the patient identification data in one step.

Astoundingly, this standard radiological practice is not used in mammography, which is one of the most prevalent of all x-rays utilized in the developed countries. The reason that the usual x-ray identification procedure is not used in mammography is that the standard mammography cassette is made of thin plastic and is too fragile to permit the use of a sliding lead blocker. For lack of a standard system, data labeling of mammograms has haphazardly transpired by diverse techniques. In the production of an x-ray film mammogram, some radiology centers flash the patient data onto the x-ray film at a time and a location normally remote from the original radiological exposure of the mammogram, using darkroom devices such as the Kodak Model B. This method requires contact with the x-ray film by the human hand, risking fingerprints. Any fingerprints which result from the direct film handling show up as troublesome artifacts on the developed x-ray image, potentially causing erroneous x-ray interpretation. There additionally exists risk in the possible confusion, and misidentification, of films within the darkroom. The darkroom method for emplacing identification data on mammograms is furthermore cumbersome, labor intensive, and protracted in time and space.

In xeromammography, another popular form of mammography, there is even less ability to properly label the x-ray film with appropriate patient data. Some facilities producing xeromammograms attempt to label them during the initial exposure by using plastic alphanumeric letters and numbers. These small and numerous plastic artifacts are difficult and time consuming to handle, are frequently misarrayed, misaligned or lost, and do not create a pleasing or professional image on the developed xeroradiographs. In response to the difficulties in emplacing patient identification within the image field of both film-mammograms and xeromammograms, the majority of mammographers simply affix a pressure-sensitive patient identification sticker after each mammogram film exposure is fully processed. Some mammographers even enter patient data on the back of the processed xeromammogram with pencil. The gap in time, and often in space, between the initial x-ray mammography of the patient and the later labeling of the mammogram is conducive to error at a degree which has long since ceased to be tolerated in the production of conventional, film-screen technique, medical x-rays.

The present invention specially addresses these above-referenced deficiencies in the art and is concerned with positive patient data identification marking within the image field of medical x-rays, and particularly on mammograms of both the film and xeromammography types.

SUMMARY OF THE INVENTION

The present invention is embodied (i) in a data marking system for medical x-rays which incorporates as one component a label, (ii) in a method of making such data marking system, and (iii) in a method of using such data marking system. The data marking system is readily and easily used in room light by employing only a ball-point pen, mechanical writing instrument or typewriter, and requires no expensive darkroom devices nor any further equipments. The data marking system renders positive patient data and identification onto the permanent image of an x-ray photograph at the same time that the patient's anatomic image is obtained. The system is generally applicable to all x-ray radiography; but more particularly, to the three prior art system variants applicable to standard screen x-ray mammography, positive mode xeromammography, and negative mode xeromammography.

The data marking system apparatus of the present invention comprises elements which are in the form of specifically constructed laminated layers physically carried upon a substrate. The substrate is normally a simple, flexible, index-type paper card which is (i) transparent to x-rays and (ii) suitable for insertion into and manipulation within a typewriter. At a first area upon one side of the card a layer of soft material is affixed. The soft material is transparent to x-rays. It is nominally plastic and preferably polyester film. The most rudimentary apparatus embodiment of the present invention comprises only one additional, third, element: a layer of fracturable blocker material, nominally metal and preferably lead or tin, which overlies the layer of soft material. The blocker material is opaque to x-rays. It is interactive with the underlying layer of soft material to be stencilized when compressed by the mechanical forces resultant from firm handwriting or typewriting.

The actual process of stencilizing the layer of blocker material is the reverse of embossment and is best described as impressing. During handwriting or typewriting of the blocker layer the image areas of the written characters are deformed and fractured or split from the front (as opposed to the rear) of the blocker layer in forming a stencil within such blocker layer. The card mounting the stencilized blocker layer is then place face down onto the x-ray film, preferably a mammography cassette, at an appropriate location upon the side facing a source of x-rays. When the x-ray is exposed, the patient data is permanently and neatly recorded in the film image without any further manipulation.

In order to incorporate further advantageous features, the preferred embodiment of the data marking system apparatus may optionally incorporate additional layers or elements. Particularly in these variants of the apparatus supporting mammography, a layer of adhesive material which is transparent to x-rays is optionally affixed upon the same side of the card, and adjacent to, the superimposed layers of soft and blocker materials. The adjacent area adhesive material, preferably pressure sensitive adhesive, is preferably covered with a peelable shield, normally plastic. After the layer of blocker material upon the flexible card is stencilized then the adhesive in the adjacent area is exposed by peeling away the shield layer. The exposed adhesive thereafter serves to hold the stencilized blocker layer onto an x-ray film cassette.

In order to physically size the data marking system apparatus so that it is (i) appropriately large so as to be readily manipulatable during typewriting while (ii) still producing a label appropriately small so as to be readily affixed to a mammography cassette, the flexible card is optionally perforated so that the areas of the stencilized blocker material and adjacent adhesive may be detached from the remainder of the card. Only the detached area is emplaced on the cassette in order to form a label therefore.

In order to make any handwriting or typewriting of the blocker layer more visible, a layer of printable material which is transparent to x-rays, nominally titanium-based white paint, is optionally applied over the layer of blocker material. This printable layer simply permits the stencilizer of the blocker layer to visually confirm the information impressed thereon during the handwriting or typing.

Finally, in order to facilitate the manufacture of the data marking system apparatus a backing support layer is optionally used for support of the other layers during manufacture of an intermediate product. This backing support layer, which is transparent to x-rays preferably comprises Kraft paper which permits fabrication of the blocker material (metal) superimposed upon the soft material (plastic) as an intermediate product in the form of an elongate tape. Upon final assembly the soft and blocker material layers on Kraft paper tape are adhesively affixed upon the card carrier. The backing support layer used during manufacturing then serves no further purpose.

The present invention is also embodied in a method for using a data marking system apparatus. In one variant embodiment method an adhesive affixation, and reaffixation, of a single label to a succession of x-ray films taken for a single patient is performed. In another variant embodiment of the method, a label component which is generated in accordance with the present invention is emplaced on the top of the platform (rather than the cassette) used in a "dedicated" mammography unit. The single label thereafter serves to identify all xeromammograms which are exposed (whether by film-screen or xerox method).

The present invention thus incorporates aspects going to an apparatus, to a manufacture of the apparatus and to a method of use of the apparatus of a medical x-ray marking system which is particularly compatable with all forms of x-ray mammography, including xeromammography.

DESCRIPTION OF THE PREFERRED EMBODIMENT

The present invention of a data marking system for medical x-rays and preferably mammograms is embodied in an apparatus having elements including a label. The lable is stencilized with patient identification data by simply handwriting or typewriting upon the label. The label is thereafter adhesively affixed to an x-ray film cassette or xeroradiography cassette to serve as a stencil in order to cause reproduction of the patient data upon the permanent x-ray image resulting from x-ray exposure. The data marking system of the present invention is particularly suitable for mammography wherein plastic x-ray cassettes are employed. These cassettes are too fragile to permit the use of a conventional lead blocking screen.

The data marking system apparatus of the present invention is based on certain essential elements. By way of overview, the system has as a first element, a flexible card or substrate which is transparent to x-rays, which is preferably suitable for manipulation within a typewriter, and which serves as a substrate for physical support of remaining elements which are in the form of stacked film layers. The card is normally index sized and made of paper or plastic. Upon the substrate card is disposed a layer of soft material, normally plastic, which is transparent to x-rays. Upon the top of this layer of soft material is a layer of blocker material, normally metal and particularly lead or tin, which is opaque to x-rays.

In operation, when the blocker material, which forms a foil layer, is locally compressed by localized forced resultant from either typewriting or handwriting thereupon, it will be fractured i.e. split by being forced into the underlying soft layer. Upon the release of the imprinting force, an affected image area of the foil will undergo the opposite of the physical process of embossing (the foil undergoes a "deembossing" or "debossing"); whereby the foil layer is imprinted along the fracture lines resulting in a permanent impression being formed therein which creates a stencil of the typed or written character images.

By this physical impression, the foil material at those image area locations which are impressed by action of typewriting or handwriting are selectively cut or slit whereby x-rays are free to pass therethrough. Thereafter when this impressed, i.e. stencilized, foil layer is placed upon the surface of an x-ray cassette, including by optional additional adhesive features supporting such placement, it will serve as a stencil for selectively occluding the exposure of the underlying media, either x-ray film or xeroradiography plate, by x-rays except in those selected impressed or cut areas of the foil.

Figure 1:
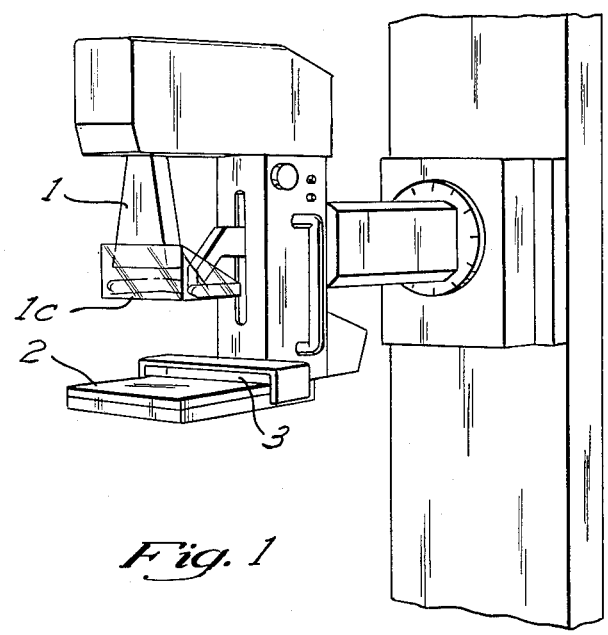
FIG. 1 shows a prior art dedicated x-ray mammography unit which is typical of the medical x-ray apparatus with which the data marking system of the present invention may be employed.

A detailed discussion of the present invention will be undertaken with reference to FIG. 1-5. Because the data marking system of the present invention is particularly suitable for use in mammography, a conventional prior art dedicated x-ray mammography unit is illustrated in FIG. 1. Such a unit is available from various manufacturers, namely General Electric, Siemens, CGR, Philips, Co-Rad, Spectrascan, or Elscint. A dedicated mammography x-ray unit of this type is often used for offering (i) those x-ray production characteristics most suitable for mammography purposes, (ii) compactness, (iii) efficient operability, and (iv) magnification mammography capability. As is conventional, the x-ray mammography unit incorporates a source generator of x-rays 1 which uses an x-ray tube voltage typically in the range of 25 to 49 KV with a nominal moylbdenum anode material. During a conventional contact mammogram, the patient's breast is placed upon the platform 2 and is moderately compressed thereupon by a compression plate 16. The x-ray mammography unit receives an unexposed x-ray film in a cassette 16 which is removably mounted in a cassette tunnel 3 formed in platform 2. By activation of the x-ray tube 1, x-rays travel through the compression plate 1c, breast and cassette thereby exposing the x-ray contained in the cassette 16.

Figure 2:
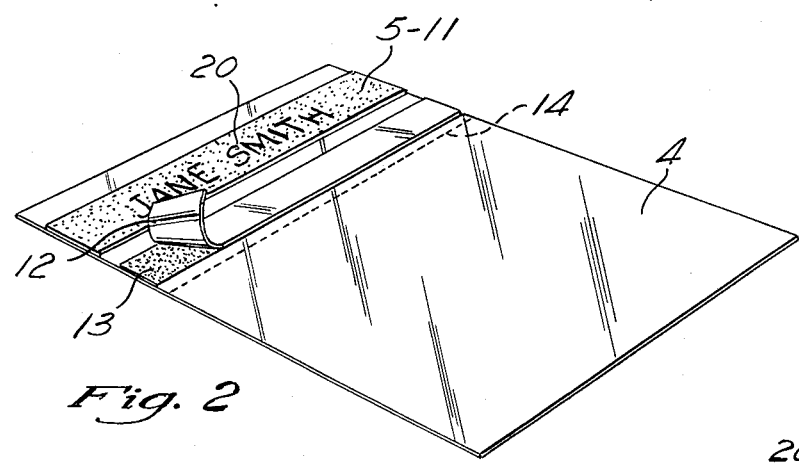
FIG. 2 shows a preferred embodiment implementation of the data marking system apparatus of the present invention having an index-sized paper card.
Figure 5:
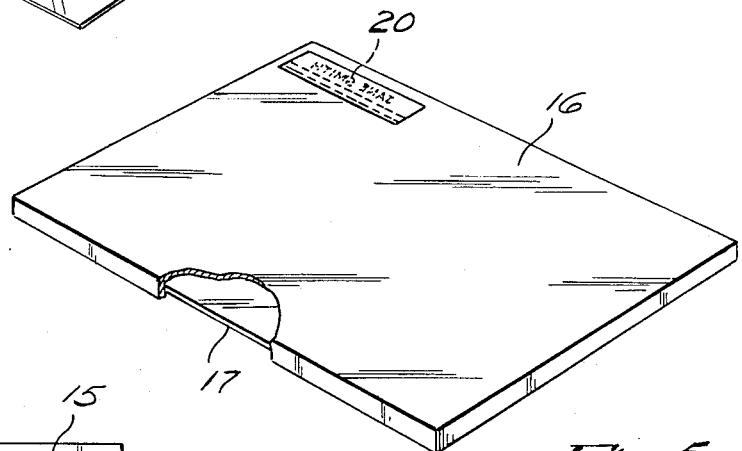
FIG. 5 shows one possibility of deploying that label element of the apparatus of the present invention previously seen in FIG. 4 wherein the label element is mounted in a face-down position upon a xeromammography cassette.
Figure 4:
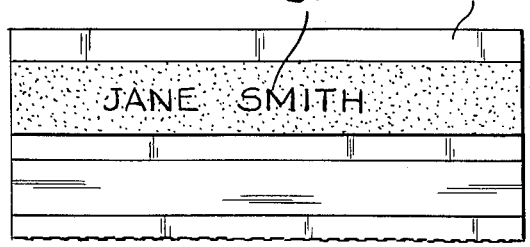
FIG. 4 shows the appearance of the label element of the present invention of a data marking system when typewritten and detached from the larger, index-sized, card shown in FIG. 2.

A preferred embodiment implementation of the present invention of a data marking system for medical x-rays is illustrated in FIG. 2. A substrate 4 is preferably formed of a paper card of index size (3.5"×5.0"). It supports additional data marking system elements. The card 4 is transparent to x-rays and of an appropriate size and flexibility for easy insertion within a typewriter. The card 4 mounts in a first area a series of overlayed or stacked layers 5–11 which collectively comprise a composite label, and in a second area upon the same side layers 12–13. The card 4 is also normally provided with a perforated line 14 in order that the portion of such card mounting layers 5–13 may be detached after stencilizing the label, and separately affixed to an x-ray cassette or tunnel platform.

Figure 3:
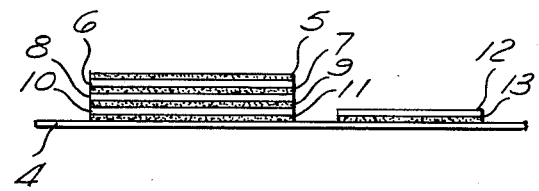
FIG. 3 is a cross-sectional view, enlarged in the vertical dimension, taken along aspect Line 3—3 of FIG. 2 and showing the layers within the preferred embodiment of the apparatus of the present invention.

A cross-sectional view, not to vertical scale either in the aggregate or in the individual superimposed layers represented, of the data marking system apparatus of the present invention taken along aspect line 3—3 of FIG. 2 is shown in FIG. 3. The particular designation, preferred material, nominal specific material thickness range, and preferred thickness of each of the layers 4–13 is presented in tabular form below:

| Layer No. | Layer Designation | Preferred Material | Thickness Range | Preferred Thickness |
|---|---|---|---|---|
| 5 | PRINTABLE LAYER | paint, titanium based white | 1–3 mil. | 1.5 mil |
| 6 | BLOCKER LAYER | metal foil, lead or tin | .5–10 mil. | dependent upon x-ray system utlized |
| 7 | FIRST BINDING LAYER | adhesive, pressure sensitive | .25–3 mil | 1.5 mil |
| 8 | RESILIENT SUPPORT LAYER | plastic, mylar polyester | .25–3 mil | 1.5 mil |
| 9 | SECOND BINDING LAYER | adhesive, pressure sensitive | .25–3 mil | 1.5 mil |
| 10 | BACKING LAYER | paper, 60 lb. Kraft | | n/a |
| 11 | ADHESIVE LAYER | permanent adhesive | | n/a |
| 4 | SUBSTRATE LAYER | paper or plastic, paper index card | | n/a |

-continued

| Layer No. | Layer Designation | Preferred Material | Thickness Range | Preferred Thickness |
|---|---|---|---|---|
| 12 | PEELABLE LAYER | shield plastic, polyester film | | |
| 13 | ADHESIVE LAYER | adhesive, pressure sensitive | | |
| 4 | SUBSTRATE LAYER | paper or plastic, paper index card | | n/a |

The layers 5-10 are normally manufactured as a laminated continuous tape which is cut to length and applied to the substrate card 4. This tape has a backing support layer 10 which is normally made of paper stock and utilized solely to aid in manufacture. Above the backing support layer 10 is (i) a thin adhesive layer 9, (ii) a soft or resilient support layer 8 which is normally fabricated of plastic, (iii) another adhesive layer 7, (iv) a blocking or foil layer 6 which is normally formed of metal, and (v) an uppermost printable layer 5 which is normally formed of white paint.

Of these layers diagrammatically shown in FIG. 3, only the blocking, or foil, layer 6 which is normally made of metal and the soft, or resilient support layer 8 which is normally made of plastic should be considered essential to the function of the present invention. These layers are operative so that when the foil layer 6 is either mechanically struck by a typewriter key or firmly depressed by a mechanical writing instrument, it will be impressed whereby due to the layer 6 being supported by underlying resilient layer 8 the foil layer is selectively impressed causing the foil layer 6 to selectively split by shear forces exerted by the typwriter character font or mechanical writing instrument. In this regard, the resilient layer 8 preferably is 1.5 mil. thick mylar or polyester material and serves to support the foil layer 6 yet permit deformation of the foil layer 6 during mechanical impression by compressing in thickness in an amount necessary to allow the foil layer 6 to fracture or be cut by shear forces exerted in the foil layer. When the pressure is released, the fractured material of foil layer 6 will remain imprinted and split in the area of the mechanical depression and thereby allows th passage of x-rays through in the selected split or fractured areas of the foil layer. However, the remaining portion of the foil layer 6 still forms complete barrier or block for x-ray radiation. As such the imprinted regions of the foil layer 6, thereby forms a stencil.

The uppermost printable layer 5, normally comprises titanium based white paint, and is optionally included in the preferred embodiment of the present invention solely to allow a visual record of the imprinting by typewriting or mechanical writing which results in the fracturing of foil layer 6. In this regard, the layer 5, although subject to being impressed by the local compressive forces occuring during mechanical imprinting is not fractured thereby and its surface qualities are such to readily accept ink or the like from the typewriter, thereby allowing a visual inspection of the indicia formed therefrom. Since the uppermost layer is preferably formed of paint, no adhesive is needed to retain it on top of the foil layer 6. Layers 7 and 9 are typically formed of pressure sensitive adhesive which respectively serve to retain the foil layer 6 to the underlying resilient layer 8, and the resilient layer 8 in turn to the underlying backing layer 10 of paper.

The type of metal and the thickness of foil layer 5 (shown in cross-section in FIG. 3) is established in consideration of the power level and operational characteristics of the particular x-ray unit in which the data marking system of the present invention will be employed. Three different constructions of the foil layer 5 are particularly appropriate for mammography. For use as a stencil sufficient to stop an x-ray beam of a standard film-screen technique x-ray apparatus as performed with a molydenum anode and a 28-35 Kilovolt beam strength, the foil layer 5 is preferably formed having a thickness of at last 0.5 mil and comprises a 99% pure lead, and is optimally 1 mil. of 99.9% pure lead. Although x-ray production by the standard film-screen technique is in the range of 15-20 kev, the superior opaqueness of lead to x-ray radiation in the range of 13-16 kev makes it suitable for use in this application.

In the creation of a data marking system for use in positive mode xeroradiography or xeromammography, the foil layer 5 is preferably greater than 3 mil. in thickness and is formed of tin have purity preferably greater than 99%, and is optimally 4 mil. thickness of 99.99% pure tin. Positive mode xeroradiography or xeromammography employs a tungsten anode. The tungsten anode in xeroradiography and xeromammography produces x-rays with an energy of 25-45 Kev. This energy range is best stopped by tin metal which has a peak x-ray absorption at 29.2 kev.

Finally, the foil layer 5 which is preferred for negative mode xeroradiography or xeromammography is preferably greater than 0.750 mil. of tin preferably greater than 99% pure, and is optimally 1 mil. thickness of 99.99% pure tin. The negative mode xeroradiography or xeromammography again uses the tungsten anode and an x-ray tube voltage in the range of 40-50 Kev. Tin is again the best metal element to block the x-rays of this process. However, much less thickness is used. Toner "robbing" by any metal within the collimated field of negative mode xeroradiography or xeromammography will create a white halo upon the exposed x-ray. Any thickness of tin which is substantially greater than 1 mil. will seriously degrade the image by producing a white halo. Consequently, the tin toil layer 5 is preferably less than 1.5 mol. in thickness for negative mode xeroradiography or xeromammograhy.

In close proximity to the area of superimposed layers 5-11 is an adjacent area of layers 12-13. The uppermost shield layer (or tape) 12 is normally 1.5 mil. of mylar plastic or polyester film. This layer 12 is superimposed over an adhesive layer 13, normally 1.5 mil. of pressure sensitive adhesive. Both layers 12 and 13 are transparent to x-rays and as will be explained in more detail infra are utilized to permit rapid affixation of the label to a desired surface for x-ray exposure With the structure defined, the operation of the data marking system of the present may be described. Initially the card 4 is placed in a conventional typewriter wherein desired patient information i.e. indicia 20 may be typed or applied to the region of the card carrying the layers 5 through 11. Alternatively the same can be accomplished by a mechanical writing implement. The card is subsequently removed from the typewriter and preferably torn along the perforation 14 to separate the layers 5 through 13 from the remaining portion of the card and the film strip or layer 12 may be removed from the card 4 to expose the adhesive layer 13. The device may them be emplaced upon a mammogram cassette 16 which encapsulates an x-ray film 17 which is shown partially exposed in cut-away view. The label portion 15 comprising the layers 5 through 13 is placed upon the top, or that side toward the source of x-rays, of cassette 16 in a face down orientation and is maintained thereon by the adhesive layer 13. This placement makes that the indicia 20 of the stencil appears as mirror image as viewed from above in FIG. 5. This mirror image is intended to be illustrated by the dashed line representation of such indicia in FIG. 5. In actuality, the indicia 20 is not visible when the label 15 is placed upon the cassette 16 in the indicated orientation. The resultant image upon an exposed x-ray assumes an appropriate orientation because the radiologist views an exposed mammogram produced from x-ray film 17 from the bottom side as the film appears in FIG. 5:

The adhesive layer 13 for affixing the label 15 permits several possibilities in producing patient data visible on an exposed x-ray mammogram. Particularly, the label may be emplaced onto the mammography cassette 16 (shown in FIG. 5) at (i) that side of such cassette which is toward the source of exposing x-rays (the x-ray generating head 1 shown in FIG. 1), (ii) an area of such cassette 16 which is within the collimated area of the exposing x-ray beam, and (iii) an area of such x-ray cassette 16 which will be outside the region where anatomic x-ray-imaging of the patient's breast will occur. The pressure-sensitive adhesive layer 13 permits the label 15 to be readily removed from an exposed mammography cassette 16, and adhesively reapplied onto a subsequent, unexposed mammography cassette. This convenient attachment and reattachment of label 15 permits that one label will suffice for a series of mammograms, of which two exposures are normally taken of each breast.

Finally, it is also possible to emplace the adhesive label 15 directly upon the mammography platform 2 (shown in FIG. 1). When emplaced upon such platform, the label is again put within the collimated area of the x-ray exposure of the mammography cassette 16 (or else it would fail to image information onto the x-ray film 17 within such cassette), and outside the region whereat anatomical x-ray imaging of the breast will occur. The possibility of emplacing readily created labels directly onto the x-ray imaging platform 2, or onto like areas of other x-ray equipments, permits that facility, location, patient name, equipment identification, and data data may readily be exposed onto x-rays, particularly including mammograms. For example, two labels in accordance with the present invention might be used in the generation of a single x-ray exposure. One such label might be associated with identifying the facility machine, date, etc. at which such x-ray was derived, and the second label might be dedicated to patient identification data. One label might be upon the imaging platform, and one upon the x-ray cassette.

As will be recognized subsequent to placement of the label portion 15 upon the cassette 16 or platform, activation of the x-ray source 1 caused the indicia 20 to be permanently recorded on the x-ray film 17 due to x-rays passing through the imprinted cut portions of the foil layer 6 underlying the indicia 20 but not passing through (i.e. being blocked) the remaining portion of the foil layer 6.

In accordance with the preceding discussion, alternative embodiments of the invention, alternative means for manufacture, and/or alternative modes of application will be suggested to a practitioner of the art of designing films and equipments for radiology. For example, the label layers 5–11 might be peeled from the card surface 4 and attached to the x-ray film or cassette by an adhesive surface which was upon either side of such layers (as the application case may dictate). In such a variant a new printable layer, equivalent to layer 5, might be established so that the printed information of the label was at all times visible (even in mirror image) during the affixation of such label to an x-ray film or cassette. For example, it is possible to create labels using alternative metals, and alternative thicknesses of metals, to serve as appropriate blocking agents to x-rays of various energies and time duration. For example, the component layers which comprise the data marking system of the present invention may be fabricated in diverse manners. Finally, it will be recognized that labels in accordance with the present invention are relatively inexpensive, small, and convenient of generation. Therefore they are potentially ubiquitous of application to industrial, as well as to medical, x-ray imaging.

Therefore, the present invention should be broadly interpreted by the following claims, only, and not merely in context of that particular preferred embodiment in which the present invention has been taught.

What is claimed is:

1. A data marking system for medical mammography comprising:
    a substrate which is transparent to x-rays and suitable for manipulation within a typewriter;
    a layer of resilient material, which material is transparent to x-rays disposed upon an area of the card;
    a layer of blocker material, which blocker material is opaque to x-rays disposed upon the layer of resilient material, which, when temporarily compressed by a force resultant from normal typewriting, is locally fractured to permit x-rays to pass through the blocker material in the locally fractured area.

2. The data marking system according to claim 1 further comprising:
    a layer of adhesive material, which adhesive material is transparent to x-rays, disposed adjacent said area side of the card.

3. The data marking system for medical x-rays according to claim 2 further comprising:
    a peelable shield layer disposed upon the layer of adhesive material, for protecting the adhesive layer until removed by peeling.

4. The data marking system according to claim 2 wherein the layer of adhesive material is pressure sensitive.

5. The data marking system according to claim 4 wherein the pressure sensitive adhesive layer may be separated from a first surface to which it is adhesively affixed and reaffixed to a successor surface.

6. The data marking system according to claim 1 further comprising:
    a layer of printable material, which printable material is transparent to x-rays, disposed upon the layer of blocker material.

7. The data marking system for medical x-rays according to claim 1 wherein the layer of blocker material comprises a metal foil having a thickness sufficient to be opaque to an x-ray beam of a standard film-screen technique.

8. The data marking system for according to claim 1 wherein the layer of blocker material comprises a metal foil having a thickness sufficient to be opaque to positive mode xeroradiography.

9. The data marking system according to claim 1 wherein the layer of blocker material comprises a metal foil having a sufficient thickness to be opaque to negative mode xeroradiography without being so thick that toner robbing results in a white halo in the xeroradiographic x-ray image.

10. The data marking system according to claim 1 wherein the layer of resilient material is plastic.

11. A medical x-ray patient data marking system suitable for affixation to the surface of mammography or x-ray film carriers during the exposure thereof, the system comprising:
   a substrate layer transparent to x-rays;
   a resilient layer disposed upon the substrate layer and transparent to x-rays, which indents upon the temporary local application of a compressive force and thereafter returns to a substantially planar condition; and
   a deformable layer disposed upon the resilient layer and opaque to x-rays, which fractures to create a stencil in response to the temporary local application of the compressive force; and
   means affixing said substrate upon a mammography film carrier.

12. The medical x-ray patient data marking system according to claim 11 wherein the resilient layer and the deformable layer are formed in area only partially coextensive with the underlying substrate layer.

13. The medical x-ray patient data marking system according to claim 12 wherein said affixing means comprises a pressure sensitive adhesive layer formed on said substrate adjacent said resilient layer.

14. The medical x-ray patient data marking system according to claim 13 wherein the pressure sensitive adhesive layer comprises means for allowing removal from the mammography film carrier surface to which it is adhesively affixed and reaffixing to a successor mammography film carrier.

15. The medical x-ray patient data marking system according to claim 11 further comprising:
   a printable layer disposed upon the deformable layer and transparent to x-rays, which transmits the temporarily applied local pressure to the underlying deformable layer while also producing a visible record of all localities whereat such local pressure was applied.

16. The medical x-ray patient data marking system according to claim 11 further comprising:
   a backing support layer, transparent to x-rays and intermediary between the resilient layer and the deformable layer, said backing support base being permanently affixed to the substrate layer.

17. The medical x-ray patient data marking system according to claim 11 wherein the deformable layer is a metal foil.

18. The medical x-ray patient data marking system according to claim 17 wherein the metal foil layer is of thickness sufficient to be opaque to an x-ray beam of a standard film-screen mammography apparatus.

19. The medical x-ray patient data marking system according to claim 17 wherein the metal foil layer is of thickness sufficient to be opaque to positive mode xeroradiography.

20. The medical x-ray patient data marking system according to claim 17 wherein the metal foil layer is of thickness sufficient to be opaque to negative mode xeroradiography.

21. The medical x-ray patient data marking system according to claim 18 wherein the metal foil layer is substantially pure lead of thickness greater than 0.750 mil.

22. The medical x-ray patient data marking system according to claim 19 wherein the metal foil layer is substantially pure tin of thickness greater than 3 mil.

23. The medical x-ray patient data marking system according to claim 20 wherein the metal foil layer is substantially pure tin of thickness between 0.750 mil. and 1.5 mil.

24. A patient data marking system for an x-ray mammography cassette, the system comprising:
   a card, which card is transparent to x-rays, insertable into a typewriter and mounting further components;
   a soft layer, which layer is transparent to x-rays, carried upon an area of the card, the soft layer being readily depressed by temporary local applications of a compressive force;
   a blocker layer, opaque to x-rays and carried upon the soft layer, which is locally fractured by temporary local compressive force applications resultant from typewriting; and
   an adhesive layer, which layer is transparent to x-rays, carried upon an area of the card separate from the soft layer, the adhesive layer comprises means for adhesively holding the stencilized blocker layer upon a mammography cassette.

25. A method of manufacturing a label suitable for use by medical personnel to record data so as to be visible as an image within the emulsion of a medical x-ray, the method comprising:
   preparing a flexible card which is transparent to x-rays and suitable for manipulation within a typewriter;
   first layering at a first area location upon the card a soft material which is transparent to x-rays;
   a second layering at the first area location upon the card on top of the soft material a blocker material which is opaque to x-rays and which is locally fractured by typewriting.

26. The method of manufacturing a medical x-ray data label according to claim 25 further comprising:
   third layering at a second area location upon the card, separate from the first area location upon the same side of the card, an adhesive material which is transparent to x-rays.

27. The method of manufacturing a medical x-ray data label according to claim 26 further comprising:
   fourth layering at the second area location upon the card and on top of the adhesive material a peelable shield which protects the adhesive until removed by peeling.

28. The method of manufacturing a medical x-ray data label according to claim 27 wherein the fourth layered peelable shield is transparent to x-rays.

29. The method of manufacturing a medical x-ray data label according to claim 25 further comprising:

third layering at the first area location upon the card and on top of the blocker material a printable material which is transparent to x-rays and which will visibly display typewriting.

30. THe method of manufacturing a medical x-ray data label according to claim 26 further comprising:
printing a card with directions for use in a third area location, separate from the first and second area locations upon the same side of the card.

31. The method of manufacturing a medical x-ray data label according to claim 26 further comprising:
perforating the card so that the first and second area locations may be detached from the remainder of the card.

* * * * *